Sept. 22, 1964  E. KEZNICKL  3,150,377
INDICATOR OF EXPOSED LENGTH OF FILM FOR A MOTION PICTURE CAMERA
Filed July 10, 1959
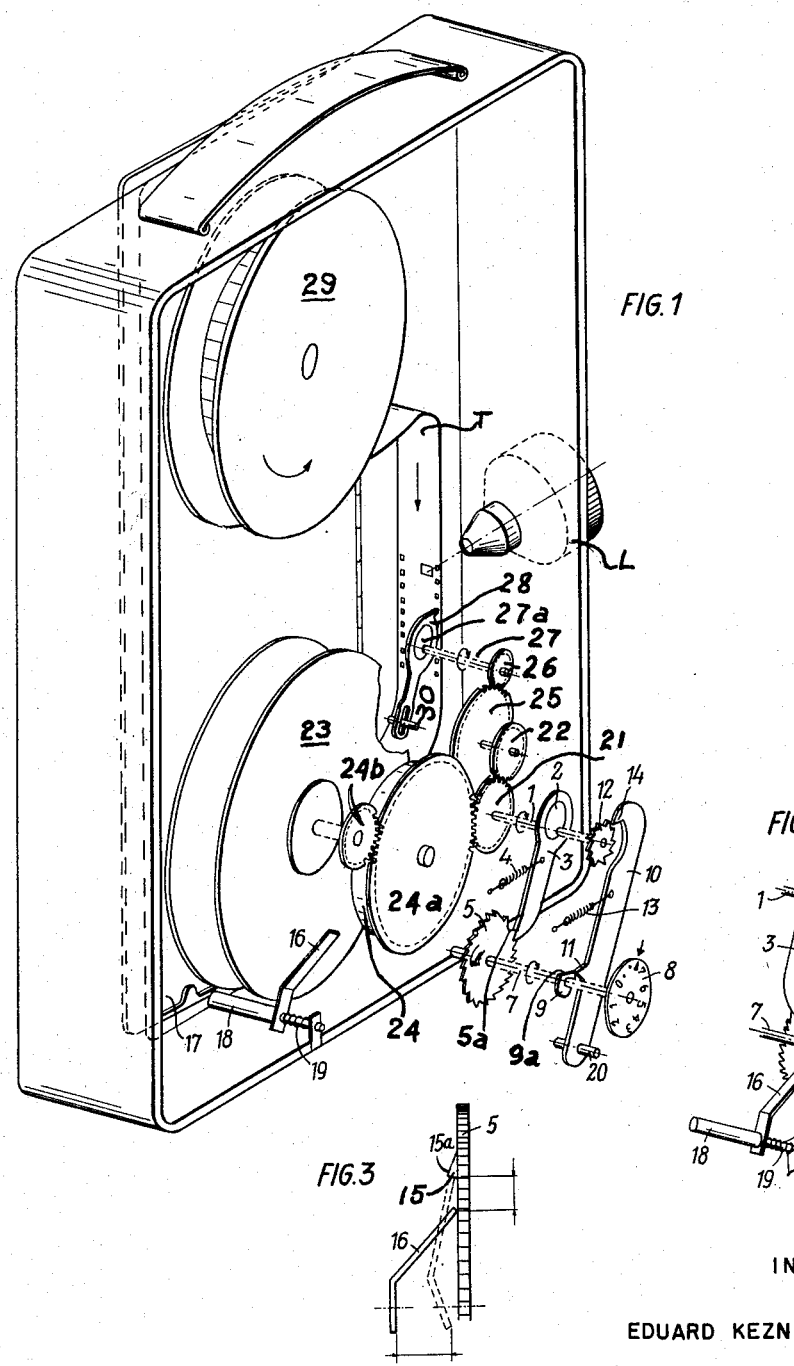
INVENTOR
EDUARD KEZNICKL
BY:
ATTORNEY

United States Patent Office 3,150,377
Patented Sept. 22, 1964

3,150,377
INDICATOR OF EXPOSED LENGTH OF FILM
FOR A MOTION PICTURE CAMERA
Eduard Keznickl, Vienna, Austria, assignor to Alois Handler and Karl Vockenhuber, both of Vienna, Austria
Filed July 10, 1959, Ser. No. 826,150
Claims priority, application Austria July 22, 1958
5 Claims. (Cl. 352—172)

The invention relates to a calibrated indicator of exposed length of film for a motion picture camera, and more particularly a motion picture camera using substandard size film, in which the calibrated indicator is driven by the film feed, and in which the drive of the indicator is disengaged after a certain length of film has been exposed.

In known indicators of this kind a calibrated disc is connected with a return spring, which forces the disc back to its zero position when the cover of the camera or the film channel is opened. This arrangement has the disadvantage that the disc is reset to its starting position when the camera is opened for any reason, for example to correct malfunctions or to rewind the film.

The invention overcomes this disadvantage in that a means is provided to force the calibrated disc to its zero position, only when the drive of the disc by the film feed is disengaged as a consequence of a certain length of film having been exposed, at which time closing the cover of the camera or moving the film channel or the like, moves the disc in the same direction as the driving means to its starting position, in which starting position the driving means controlled by the film feed again engages the disc.

According to the invention a cam connected to the calibrated disc may disconnect the drive of the disc after a certain length of film has been exposed. According to another embodiment of the invention a ratchet gearing is provided wherein the toothed wheel of this gearing has a flat in place of at least one tooth, so that the drive of the calibrated disc is interrupted when reaching said flat.

According to this feature of the invention the calibrated disc is driven by a pawl engaging a ratchet wheel having a flat in place of at least one tooth, in which flat the pawl rests after a predetermined length of film has been advanced in a direction corresponding to a direction for exposure. The width of the flat is greater than one feed step of the pawl, so that the pawl cannot step the ratchet wheel.

In a preferred embodiment of the invention the ratchet wheel is connected to a second ratchet wheel, the ratchet of the latter being for example, controlled by the cover of the camera, the film channel or the like, so that the pawl of the second ratchet wheel engages the corresponding teeth, preferably consisting of one single tooth, when the pawl of the first ratchet wheel is engaged in a flat in place of at least one tooth of the first ratchet wheel.

The embodiment may be utilized in cameras in which the lens is shifted to facilitate exposure of both sides of the film, or the arrangement may be easily installed in cameras where the film reels are shifted to bring about the same result.

According to another embodiment of the invention the single tooth of the second ratchet wheel is a single tooth, provided on a side of the first ratchet wheel. This tooth may be formed as a projection by a pressing tool.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows diagrammatically the entire arrangement of the exposure indicator, FIGS. 2 and 3 show details of the novel features.

In the embodiment shown a motor 24 drives a film spool 23 through a gear 24b. Gear 24a, which is driven by the motor 24, drives the gear train 21, 22, 25 and 26. These gears of the train have the proper ratio to control the speed of the shaft 27, which in turn is attached to an eccentrically mounted cam 27a. The cam 27a reciprocates a feed claw 28, which is slidably mounted on stub shaft 30, in such a manner as to engage the film tape T and feed the film tape from film reel 29 past the lens L.

Gear 21, which is driven by the gear 24a, is mounted on shaft 1 which in turn rotates an eccentric 2, causing the pawl 3 which engages the ratchet wheel 5, due to the tension of the spring 4 to rotate a ratchet wheel 5, which is mounted on a shaft 7 of the calibrated disc 8. The ratchet wheel 5 has a flat 5a in place of at least one tooth, into which the pawl 3 engages after the entire spool of film has been exposed, thereby interrupting the drive of the calibrated disc 8. A single tooth 15 is formed laterally on the ratchet wheel 5, and this single tooth coacts with another pawl 16 which has two arms and is flexible for the reason later described.

The described arrangement operates as follows:

After the entire length of film has been exposed the pawl 3 engages in the flat 5a of the ratchet wheel 5. As long as the cover 17 of the camera is closed after advancement of the entire length of film for exposure the pawl 16 rests upon the tooth 15. Upon opening the cover the pawl 16 is shifted toward the left by the spring 19 and its free end or arm slides over the surface 15a of the tooth 15 to lie directly ahead of the path of the tooth. When the cover 17 is closed again a tube 18 presses the lower arm of the pawl 16 towards the ratchet wheel, causing the free arm of the pawl 16 to deflect upwardly, thereby turning the ratchet wheel 5 by engaging the tooth 15 as shown in FIG. 3 until the calibrated disc 8 reaches a start position corresponding to the zero position. Simultaneously the pawl 3 reengages the teeth of the ratchet wheel 5.

With this arrangement it is possible to open the camera while the spool of film is partially exposed, without influencing the calibrated disc 8. Resetting is performed only when the camera is opened after the entire film length has been exposed.

The parts 9 to 14 and 20 shown in FIG. 1 illustrate a sound producing warning device which provides audible warning during exposure of certain parts of the total length of the film described in Patent No. 3,032,002 issued May 1, 1962.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

I claim:

1. In a camera, a film spool, a drive motor for driving said film spool, a rotatable calibrated disk for indicating film footage advanced in a selected direction for exposure, a first and a second driving means alternately driving said calibrated disk in the same direction, said first driving means comprising a pawl driven in dependence upon advancement of the film in said selected direction, and a toothed ratchet wheel engaged by the pawl and coupled to said calibrated disk, said ratchet wheel having a flat in place of at least one tooth, means to engage said pawl in said flat after a predetermined footage of film has been advanced in said selected direction, the width of the flat being greater than one feed step of the pawl, means cooperative with the second driving means to operably connect the second driving means with said calibrated disk only when the pawl engages the flat in place of at least one tooth of said ratchet wheel, means operable in preparation for loading said camera to actuate said second driving means in cooperative relation with the last-mentioned connecting means to reset said calibrated disk to a start position corresponding to a zero footage position in which said pawl engages the teeth of said ratchet wheel to drive said calibrated disk.

2. A camera as claimed in claim 1, in which said first driving means comprises a driven eccentric cam for driving said pawl of the first driving means.

3. A camera as claimed in claim 1, in which said second driving means comprises a second pawl actuated by said means operable for reloading the camera, said ratchet wheel coupled to the calibrated disk having a single tooth formed to cause in operation said second pawl to engage said single tooth only when said pawl of said first driving means engages the flat in place of at least one tooth of the ratchet wheel of said first driving means.

4. A camera as claimed in claim 1, in which said ratchet wheel of the first driving means comprises peripheral teeth, and a flat in place of at least one tooth for the first driving means, and a single tooth disposed extending laterally for coacting with said second driving means, and said second driving means comprising means to engage the pawl of said second driving means with said single tooth only when the pawl of the first driving means engages said flat in place of at least one peripheral tooth.

5. In a camera, a film spool, a drive motor for driving said spool, a rotatable calibrated disk for indicating film footage advanced in a selected direction for exposure, a first and a second driving means alternatively driving said calibrated disk in the same direction, said first driving means comprising an intermittent driving means driven in dependence upon advancement of the film in a selected direction, and a toothed wheel engaged by said first driving means and coupled to said calibrated disk, said wheel having a flat in place of at least one tooth, means to engage said first driving means in said flat after a predetermined footage of film has been advanced in said selected direction, means cooperative with the second driving means to operably connect the second driving means with said calibrated disk only when the first driving means engages the flat in place of at least one tooth of said toothed wheel, means operable in preparation for loading said camera to actuate said second driving means in cooperative relation with the last-mentioned connecting means to reset said calibrated disk to a start position corresponding to a zero footage position in which said first driving means engages the teeth of said toothed wheel to drive said calibrated disk.

References Cited in the file of this patent

UNITED STATES PATENTS

| 1,583,656 | Chapman et al. | May 4, 1926 |
| 2,080,086 | Mihalyi | May 11, 1937 |
| 2,791,163 | Bammesberger | May 7, 1957 |

FOREIGN PATENTS

| 810,184 | France | Dec. 19, 1936 |